No. 868,219.
PATENTED OCT. 15, 1907.
J. M. PIETZUCH & W. E. BROWN.
WATER PRESSURE REGULATOR.
APPLICATION FILED DEC. 26, 1906.
2 SHEETS—SHEET 1.
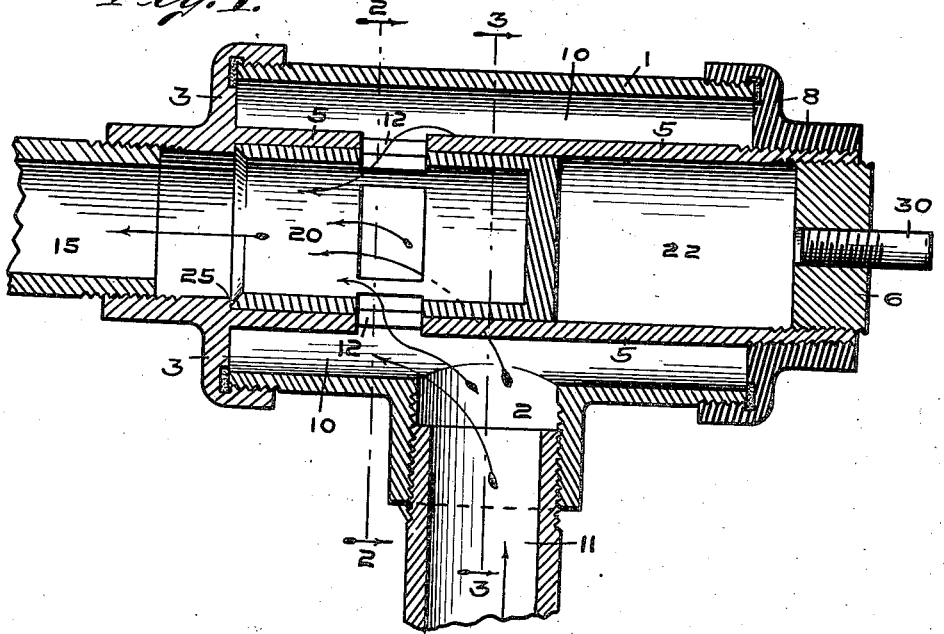
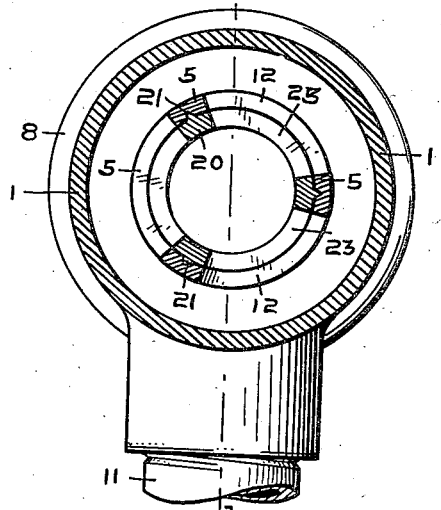
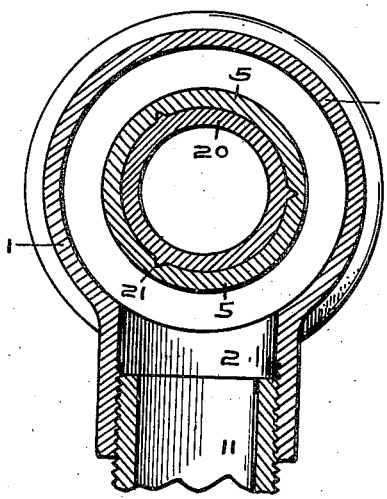
WITNESSES:
L. B. Woerner.
F. C. Dynes.
INVENTORS
John M. Pietzuch
William E. Brown,
By Minturn & Woerner,
ATT'YS.

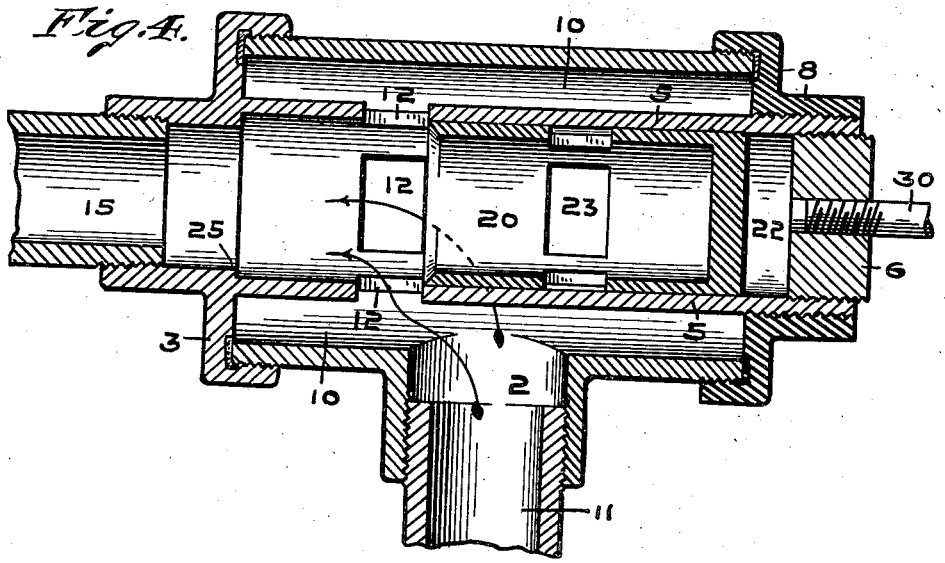
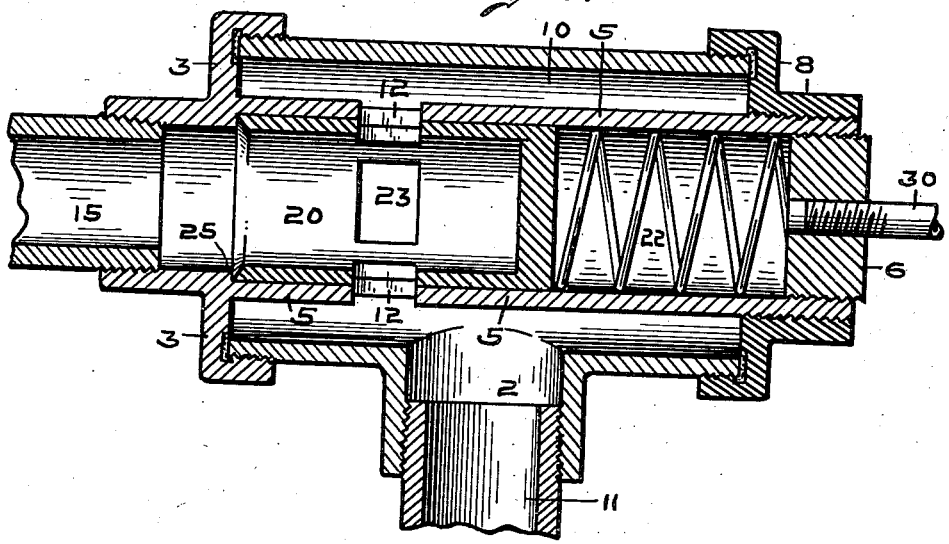

UNITED STATES PATENT OFFICE.

JOHN M. PIETZUCH AND WILLIAM E. BROWN, OF INDIANAPOLIS, INDIANA, ASSIGNORS OF ONE-THIRD TO CHARLES E. FREEMAN, OF INDIANAPOLIS, INDIANA.

WATER-PRESSURE REGULATOR.

No. 868,219.      Specification of Letters Patent.      Patented Oct. 15, 1907.

Application filed December 26, 1906. Serial No. 349,454.

*To all whom it may concern:*

Be it known that we, JOHN M. PIETZUCH and WILLIAM E. BROWN, citizens of the United States, residing at Indianapolis, in the county of Marion and State of Indiana, have invented certain new and useful Improvements in Water-Pressure Regulators, of which the following is a specification.

This invention relates to water pressure regulators employed on lines of service piping that lead from the water mains beneath the streets to buildings; and the object of the invention is to provide a water pressure regulator that will control the flow of water through said service pipes.

A further object of the invention is to provide a water pressure regulator which can predeterminedly be set so as to decrease the flow of water in service pipes when the pressure in the mains reaches a point to menace the plumbing in the building; the regulator being arranged, however, to permit the flow of the water to be increased in the service pipe when the pressure decreases in the mains.

A further object of the invention is to provide a water pressure regulator which will be simple in construction, so as to be easily cleaned and repaired; efficient in its operation, and possessing the feature that, should any difficulty in its action arise, it will not cut off the water supply from the building, as is generally the case with the regulators now in use.

We accomplish the objects of our invention by the mechanism illustrated in the accompanying drawings, forming a part hereof, in which Figure 1 is a central vertical sectional view of a water pressure regulator embodying our invention on the dotted line 1—1 in Fig. 2. Fig. 2 is a cross section on the dotted line 2—2 in Fig. 1. Fig. 3 is a cross section on the dotted line 3—3 of Fig. 1. Fig. 4 is a central vertical sectional view on the same line on which Fig. 1 is taken, and shows the valve in its back position. Fig. 5 is a view similar to Fig. 4, except that it is a modification whereby the valve is controlled by means of a spring.

In the drawings, 1 is a hollow cylindrical tube or shell which forms the casing of the water pressure regulator, and is provided with a water inlet-aperture 2. 3, is a cap having an annularly extending flange with internal threads which engage the external threads on the end of the shell 1. The cap 3 has an integrally formed hollow sleeve 5, which extends longitudinally and centrally through the shell 1. The end of the hollow sleeve 5 is closed by means of the threaded plug 6, which is screwed therein. A second cap 8 closes the end of the shell 1 opposite the one closed by the cap 3. The cap 8 has a centrally located internally threaded aperture which engages the external threads on the end of the hollow sleeve 5. The shell 1, with its ends closed by means of the caps 3 and 8, forms a primary chamber 10 into which the water flows from the inlet service pipe 11, which communicates with the inlet aperture 2, and extends through and taps the water-main. The water after entering the primary chamber 10 passes through a plurality of port-holes 12, in the periphery of the hollow sleeve 5, and thence out through said sleeve into the outlet service pipe 15, which has a threaded engagement with the cap 3.

The volume of water passing through the device is controlled and regulated by means of the pressure of the water in the mains against a cylindrically formed valve 20, which lies within and slidingly fits the internal diameter of the hollow sleeve 5. The valve 20 is provided on its periphery with one or more longitudinally extending ribs 21 which engage corresponding grooves in the internal wall of the hollow sleeve 5, so that the valve is prevented from turning therein. The valve 20 has one of its ends closed to form a cup, and is of less length than the hollow-sleeve 5. This arrangement forms a secondary chamber 22 between the closed end of the valve and the threaded plug 6, in the end of the sleeve 5. The valve 20 is also provided with a plurality of port-holes 23 which register with the port-holes 12 in the hollow sleeve 5. When the valve occupies its forward or normal position, the water can uninterruptedly flow through the regulator. The valve is limited in this direction of its movement by means of an annular shoulder 25, cut in to the interior wall of the hollow sleeve 5. The valve 20 is held into normal position by means of air which is forced through the valve-stem 30 into the secondary chamber 22. The pressure of the air within the chamber 22 is increased to a point where it will oppose, or counteract, the pressure against the valve 20, exerted by the water in the mains. The air thus holds the valve 20 into normal position and permits the water to freely pass through, when water is drawn from the outlet-service pipe 15. Should the pressure be increased in the water mains, as occurs when fire-pressure is applied, the valve 20 will be forced backward into the secondary chamber 22. This movement of the valve changes the relationship of the port-holes 12 and 23 and thus decreases the size of the stream of water passing through the regulator. The backward movement of the valve 20, by the increased pressure of the water, is only checked when the compression in the secondary chamber 22 increases to a point where its resistance will equalize the increased pressure of the water. This increased pressure of the water may only partially close the valve, or it may become so great as to entirely close it. It is submitted that when the pressure in the water-mains reaches a point to entirely close the valve 20, it becomes a menace which may weaken the plumbing in the building, or, most likely, cause any latent defect to break, with resulting damage.

One of the chief features of this invention resides in the fact that should the air seep out of the chamber 22 the normal pressure of the water will cause the valve 20 to settle back into the chamber until its front edges passes the port-holes 12 in the hollow sleeve 5, when an uninterrupted stream of water will be established in the out-let pipe 15 leading to the building. The valve occupying this position will permit the water to freely pass through the regulator as though no regulator existed in the line of pipe; but the building will be constantly supplied with water which is the object sought, in which respect many regulators fail, as they generally cut off the supply of water until repairs are made. It might also be stated that the valve 20 would work equally as well by placing a coil-spring into the secondary chamber 22 to hold said valve into normal position, instead of using air, as has heretofore been described.

Having thus fully described my said invention, what I desire to secure by Letters Patent, is—

1. In a water pressure regulator of the character described, a hollow casing or shell having its ends sealed to form a chamber and provided with inlet and outlet apertures, a hollow sleeve extending through said chamber and provided with port-holes said sleeve being of a length to permit the valve to move entirely past said port-holes, and a valve slidingly fitting the internal diameter of the hollow sleeve, and provided with port-holes that register with the port-holes in the sleeve when the valve stands in normal position, and exterior longitudinally extending ribs on the valve to prevent movement of the valve in a circumferential direction.

2. In a water pressure regulator of the character described, a hollow casing or shell having its ends sealed to form a chamber and provided with inlet and outlet apertures, a hollow sleeve extending through said chamber and provided both with port-holes and internal longitudinally extending grooves, a valve slidingly fitting the internal diameter of said hollow sleeve and provided with port-holes which register with the port-holes in the sleeve when said valve stands in normal position, and ribs on said valve to engage the grooves in the sleeve to prevent the turning of the valve in a circumferential direction.

3. In a water pressure regulator comprising a hollow shell or casing provided with an inlet and an outlet aperture, closing means for closing one end of said shell, a hollow tube on said closing means and extending through the chamber formed by said shell and provided with internal longitudinally extending grooves, said tube provided with port-holes, a second closing means closing the other end of the shell, cut-off means provided with port-holes lying within the tube for regulating the volume of water passing through the port-holes, and ribs on the valve to engage the grooves in the hollow tube and adapted to prevent the turning of the valve in a circumferential direction.

In witness whereof, we have hereunto set our hands and seals at Indianapolis, Indiana, this, 19th day of December, A. D. one thousand nine hundred and six.

JOHN M. PIETZUCH. [L. S.]
WILLIAM E. BROWN. [L. S.]

Witnesses:
F. W. WOERNER,
L. B. WOERNER.